Dec. 11, 1951     H. W. BEVARLY     2,578,393
APPARATUS FOR TREATING MATERIALS
Filed March 10, 1947     2 SHEETS—SHEET 1
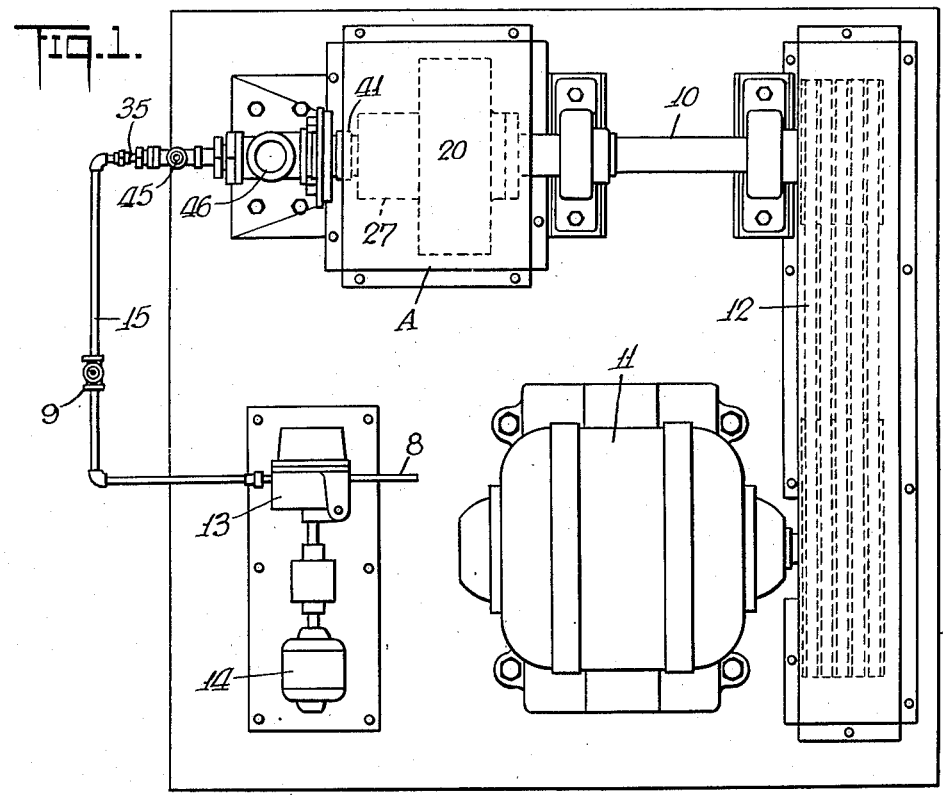
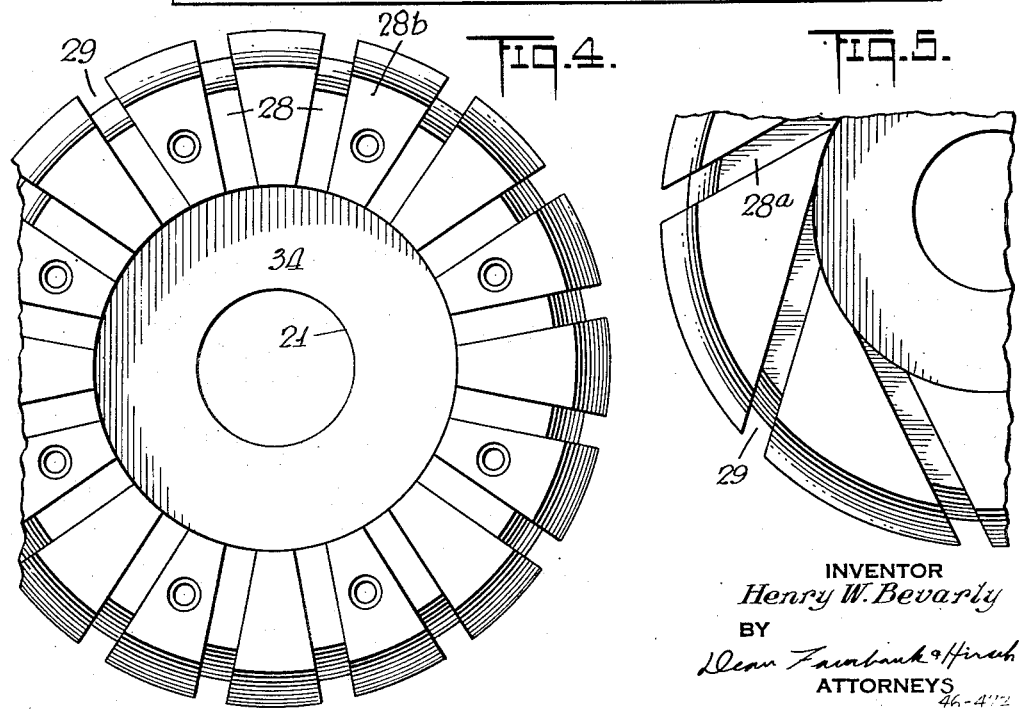
INVENTOR
Henry W. Bevarly
BY
Dean Fairbank & Hirsch
ATTORNEYS

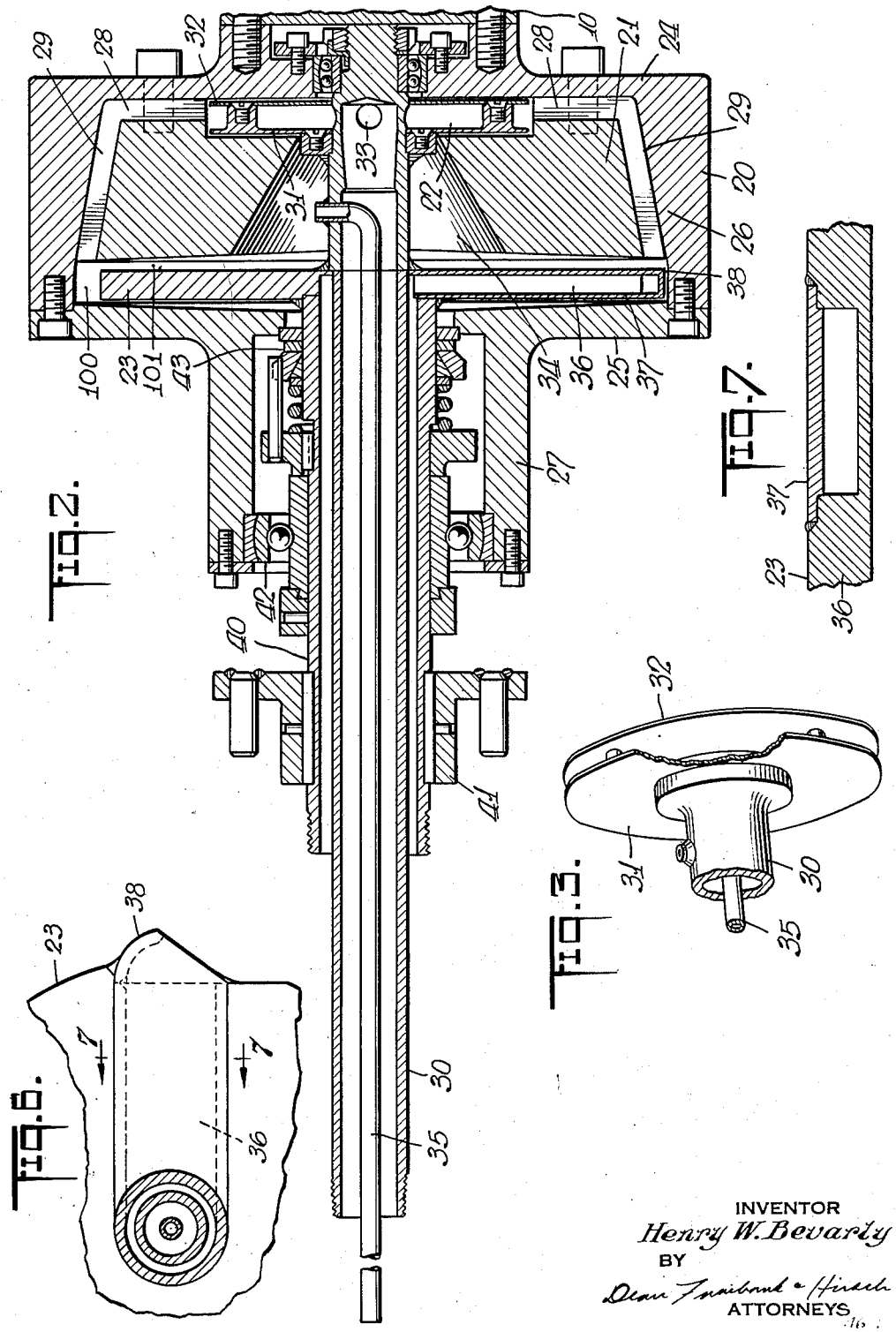

Patented Dec. 11, 1951

2,578,393

UNITED STATES PATENT OFFICE 2,578,393

APPARATUS FOR TREATING MATERIALS

Henry W. Bevarly, Louisville, Ky., assignor to The Girdler Corporation, Louisville, Ky., a corporation of Delaware Application March 10, 1947, Serial No. 733,705

11 Claims. (Cl. 259—9)

This invention relates to a new and improved method and apparatus for the treatment of materials or mixtures of materials including one or more of the steps of shearing, attenuating, separating, mixing, remixing, reconstituting, working or homogenizing of the material. More particularly, it utilizes high centrifugal forces during the treatment and the continuous passage of the material through the process and apparatus to secure the desired results. Although especially applicable to the treating of materials in plastic form, such as lubricating grease, dental cream, paint and the like, the invention however may be used in treating a wide variety of other forms of material, especially those in which a gaseous ingredient is to be added or removed.

An important object of the invention is to provide a method and means for subdividing a mass of material, separately treating the subdivided portions and reforming the same into a mass of treated material.

Another important object is to provide a method and means for the turbulent treatment of material involving changes in direction of travel thereof as well as abruptly changing such material to and from rotating and non-rotating conditions during its travel.

Another object is to provide a method and means adapted for rapidly treating a material by the employment of centrifugal forces without adding or subtracting a constituent thereof.

Another object is to provide a method and means adapted for rapidly working a material by the employment of centrifugal forces while removing an ingredient of the material.

Another object is to provide a method and means adapted for rapidly treating a material by the employment of centrifugal forces while adding an ingredient to the material.

Other objects and advantages will become apparent as the description proceeds. In the accompanying drawings there is shown merely one embodiment of the main portions of an apparatus used in carrying out the invention with alternative arrangements of the grooves or channels, but it will be understood that various changes may be made within the scope of the invention.

In the drawings:

Fig. 1 is a top plan or layout of the main unit and the associated apparatus parts.

Fig. 2 is a central longitudinal section through the main unit.

Fig. 3 is a perspective view of the portion through which the material is supplied to the chamber.

Fig. 4 is an end view of the core.

Fig. 5 is a view similar to a portion of Fig. 4, but showing inclined passages.

Fig. 6 is a face view of a portion of the ejector, and

Fig. 7 is a section on the line 7—7 of Fig. 6, but on a larger scale.

As shown in Fig. 1, the main unit A is provided with a drive shaft 10 which may be rotated at high speed from any suitable source of power, as for instance by an electric motor 11 and a conventional drive means 12. A pump 13 of any suitable type is driven by an electric motor 14 and is connected to the main unit through a pipe 15 for withdrawing gaseous or other materials which may be separated from the material in process in the unit A or for adding gaseous or other materials as may be desired. Through connection 45 material to be treated is introduced into the main unit A, as by a suitable pump (not shown) and through connection 46 treated material is withdrawn and may be passed by a suitable pump (not shown) to any desired point. Valve 9 in pipe 15 may be used to interrupt communication between the pump 13 and unit A and a suitable pipe 8 attached to pump 13 may be used to vent materials evacuated by pump 13, when used as a vacuum pump, or as an inlet to pump 13, when used for pumping a material into main unit A.

In the specific construction of the unit A illustrated in Figure 2, there is employed a rotatable casing 20 which is bolted or otherwise secured to the drive shaft 10, and within this casing there is provided a core 21, a supply distributor 22 and an ejector 23. The casing has opposite end walls 24 and 25 and a peripheral wall 26. The wall 25 is bolted to the peripheral wall and is provided with a housing or sleeve 27 for a suitable stuffing box. The interior peripheral wall is of generally conical form, that is, it is inclined in respect to the axis of rotation, so that the larger diameter is adjacent to the ejector 23. The core is bolted to the end wall 24 and is provided with grooves 28 on the smaller diameter end, and grooves 29 extending lengthwise on the inclined periphery as best shown in Figure 4. In some cases these grooves and ridges might be formed in the core or partly in the core and partly in the peripheral wall 26.

In the smaller end of the core there is provided the non-rotating distributor 32 which may be rigidly secured to a centrally disposed non-rotating hollow shaft 30, one end of which may be journaled in the end wall 24 of the casing and the other end of which may be joined to the inlet connection 45. The distributor may be formed of a pair of annular spaced plates 31 and 32 secured together in any suitable manner, and one of which may be locked rigid on the non-rotating shaft 30, to hold it against rotation. This distributor receives the material to be treated through annular ports 33 in the shaft 30, and delivers it at the periphery. The distributor may be of any desired diameter, but is shown as of approximately one-half the diameter of the casing. The distributor sets within a depression in the smaller end of the core, and the alternate grooves 28 and ridges 28b on the core lead from the periphery of this depression, in other words, from the periphery of the distributor to the grooves 29 on the periphery of the core. Thus the material, which is not rotating while in the distributor, is sheared off as it enters the grooves 29 which are rotating at high speed.

The core is spaced from the end wall 25 to leave a collecting space 100 for material, and within this space there is mounted the stationary ejector 23 which is held against rotation by being welded or otherwise rigidly secured to the non-rotating conduit 30. Preferably the ejector is closer to the end wall 25 than to the core, leaving an open space 101 which communicates with chamber 34 provided at the interior of the rotating core 21. The peripheral wall of this inner chamber 34 may be inclined so that any of the heavier ingredients which may pass inwardly between the ejector and the core may collect on said inclined surface and be returned to the periphery by centrifugal force. A pipe 35 extends centrally through the non-rotating conduit 30 and is connected through the wall thereof to the chamber 34. The opposite end of the pipe 35 may be connected to the pipe 15, thus establishing communication with pump means 13.

The ejector is preferably in the form of a solid disc having a radially extending passage 36 which may be machined into one side of the disc and covered by a cover plate 37. This disc is preferably of substantially the same diameter as the inner side of grooves 29 at the larger end of the core and is provided with an arcuate scoop 38 which communicates with passage 36 (Fig. 6), the outer lip of said scoop extending into close proximity to the inner surface of the rotating casing within the collecting space 100.

Encircling the conduit 30 and spaced therefrom, there is provided an outer pipe 40, one end of which may be welded or otherwise rigidly secured to the ejector disc 23, and which co-operates with the conduit 30 to form an annular passage connecting with the inner end of the radial passage 36 and serving as an outlet for material entering into passage 36 of said disc. At its other end pipe 40 communicates with outlet connection 46 for leading the treated material to a point of disposal. The non-rotating parts, that is, the pipes 30, 35 and 40, the distributor 22 and the ejector 23, are locked against rotation in any suitable manner, as for instance by a collar 41 keyed to the outer pipe 40 and held against rotation by a suitable bracket or support on the bed plate or frame of the machine.

The pipe 40 also serves as a support for the rotating parts. As shown, a bearing 42 is mounted within the housing 27 of the rotor for supporting the latter on the pipe 40, and a suitable stuffing box 43, also within the housing 27, seals the opening in the end wall 25 in respect to the interior of the casing. At the other side of the rotating parts may be supported by a similar bearing mounted upon the end of non-rotating shaft 30 and held in place by any suitable retaining means. Preferably drive shaft 10 forms a complete enclosure for this side of the rotating structure and no separate seal or stuffing box is required.

If it is desired to utilize the core 21 as a means for further facilitating the flow of material through the apparatus, the grooves 28, shown particularly in Fig. 4, may be substantially tangential to the chamber containing the distributor, as shown at 28ª in Fig. 5. For purposes of retarding the flow, the grooves 28ª could be inclined in an opposite direction. Likewise, the grooves 29 may also be inclined circumferentially, rather than radially as shown in Figure 4, in order to further facilitate or retard the flow therethrough.

Having thus described an apparatus suitable for carrying out the method of the invention, it will be apparent that while a comparatively small amount of material is in process at any instant, nevertheless due to the rapid travel of such material a substantial throughput is secured over an appreciable interval of time. This feature is especially desirable in the treating of materials requiring close control of the various processing steps. In using a small, compact structure the invention has been successfully carried out with the rotating parts operated at a speed of about 3600 R. P. M. Assuming valve 9 closed, for reasons later to be described, material entering the structure through inlet 46 and non-rotating shaft 30, moves to the end of that shaft whereupon it passes through ports 33 and fills the spaces within distributor 22. Upon issuing from the periphery of the stationary distributor 22, the material is first subjected to a violent shearing action and successive portions are trapped in the successive grooves 28, each of which communicates with a corresponding groove 29. As will be noted, material trapped in the grooves immediately attains a high kinetic energy since there is no rotational slippage of such material. Due to the continuity of inlet and outlet flow from the structure, each passageway through a groove 28 and a groove 29 contains a moving stream of material temporarily subdivided from the large mass of material under treatment. It is believed that a given increment of material, upon being sheared from the incoming mass, is first attenuated or stretched as it moves outwardly in grooves 28 under the influence of high centrifugal force. Thereafter upon being thrown against the peripheral inclined inner wall of the casing and changing direction in order to move through grooves 29, this increment of material will be temporarily agglomerated or compacted after which it is once more attenuated or stretched as it slides through grooves 29. Due to the high centrifugal forces employed, any gas contained in a material under treatment will temporarily separate therefrom during movement through grooves 29 and will be forced against the inner wall of groove 29 by the displacing action of the heavier material riding along the outer wall of the groove. If the apparatus be of suitable size and capable of providing a comparatively long period of treatment, non-gaseous ingredients of lower specific gravities may also temporarily separate from heavier materials in passing through the apparatus. Assuming that no advantage is to be taken from this temporary separation step, however, the successive streams of material which now have received working treatment through shearing, stretching and compact- ing, issue from the grooves 29 and deposit on the outer periphery of the collecting space 100 of casing 20, as shown at the left side of the core 21, while any gas separated therefrom fills the inward spaces of the rotating structure.

Immediately upon being deposited, the material is carried by the rotating casing 20 into contact with the scoop 38 of stationary ejector 23 whereupon a turbulent remixing, shearing, rolling and compacting action occurs. Gas which had been temporarily separated from the several filaments once more is re-mixed with the material. The one or more changes in direction of travel of the material during this turbulent treatment aids in the efficient re-mixing action. Depending upon the speed of rotation, a pressure of considerable magnitude is built up on the treated material within the ejector 23. This pressure is effective to force the material toward the axis of rotation through passage 36 and outwardly through pipe 40 and connection 46 whereupon it may enter any suitable pump (not shown) for movement to a point of disposal.

Whereas the foregoing illustrates a condition of operation in which no ingredient is to be added or removed from the material under treatment, either of these latter conditions may be secured if desired without departing from the invention. Assuming that a material, for example of gaseous nature, is to be removed, valve 9 will be opened and pump 13 will be utilized as an evacuating means. Material entering grooves 28 and 29 in the rotating structure will be sheared, attenuated and compacted as above described and as the lighter gaseous ingredient is displaced to the inner side of such grooves it will be drawn longitudinally of the groove into spaces 100, 101, 34 and thence into outlet pipes 35 and 15 into pump 13 and vented through pipe 8. The remainder of the material will, as above described, issue from grooves 29 into space 100 and undergo the same turbulent re-mixing, shearing, rolling and compacting action as it discharges into passage 36 of the stationary ejector 23 except that in this usage no gaseous ingredient is reincorporated into such material.

Assuming, on the other hand, that it is desired to incorporate an additional ingredient of any flowable type into the material entering through inlet shaft 30, such ingredient will be supplied to pump 13, acting as a positive pressure means, through pipe 8. This ingredient is then forced through pipes 15 and 35 and enters into the space 34 of the rotating structure. The rotating inclined surface of space 34 directs such material into spaces 101 and 100 whereupon it is brought into intimate contact with the worked material issuing from grooves 29. As before described the contents of space 100 are then remixed, sheared, rolled and compacted into passage 36 and due to the kinetic energy, an appreciable pressure, which in this usage would be supplemented by the pressure of the introduced ingredient, is built upon the mixed material serving to force it through pipe 40.

In each usage of the invention the material under treatment is sheared, subdivided, resheared and remixed with the result that a homogenized, worked and uniform final product is provided.

Having thus described my invention, what I claim as new and desire to secure by Letters Patent is:

1. An apparatus for treating flowable material, including a rotatable casing having an inner peripheral wall inclined in respect to the axis of the casing, a core within said casing and rigid therewith, means between said casing and said core to form a plurality of separated passages adjacent to said peripheral wall and extending in the same general direction as the axis of the casing, non-rotatable means for delivering the material to said casing at one end of said passages, and non-rotatable means for withdrawing material from said casing adjacent to the opposite end of said passages.

2. An apparatus for treating flowable material, including a rotatable casing, a core disposed therein and rigid therewith, said core having separated grooves on the periphery extending in the same general direction as the axis of the casing and radially extending grooves on one end communicating at their outer ends with the first mentioned grooves, non-rotatable means for delivering said material to the inner ends of said second mentioned grooves, and non-rotating means for receiving material from said first mentioned grooves and discharging it from said casing.

3. An apparatus for treating flowable material, including a casing, a core disposed therein and rigid therewith, said casing having an inlet and an outlet, means for rotating said casing at high speed, means for preventing any substantial circumferential flow of said material in respect to said casing between said inlet and said outlet and during said rotation, said core having a chamber communicating with the interior of said casing, and means for subjecting said chamber to sub-atmospheric pressure.

4. An apparatus for treating material, including a rotatable treating chamber having a substantially smooth inner peripheral wall surface, a core rigid therewith and having a peripheral surface presenting separated grooves extending in the same general direction as the axis of the chamber, and means for causing the material to flow generally axially of said chamber between said surfaces and along said grooves during rotation of said chamber and core.

5. An apparatus as defined in claim 4, in which said peripheral surface is conical thereby to effect movement of the material toward its end of larger diameter.

6. An apparatus as defined in claim 4, in which one end surface of said rotor has grooves for effecting outward radial movement of the material at the peripheral wall of said chamber.

7. An apparatus for treating flowable material, including a pair of rigidly connected rotatable concentric members providing substantially radial passages adjacent to one end of the apparatus and longitudinally extending separated passages between said members adjacent to the periphery and communicating with the outer ends of the first mentioned passages, a non-rotatable supply member having an annular outlet adjacent to the inner ends of the first mentioned passages, a non-rotatable ejector member having an inlet adjacent the opposite ends of the second mentioned passages, and a pair of concentric non-rotatable pipes, one connected to said supply member and the other to the inner end of said ejector member.

8. An apparatus for treating flowable material, including a non-rotatable supply member having a centrally disposed inlet and a peripheral outlet, a high speed rotor having a row of passages extending in a direction having a substantial radial component, with the inlets of said passages communicating with the periphery of said supply member whereby material entering said passages is sheared from the material in said supply member and forced outwardly by centrifugal force, and said rotor also having passages with their inlets registering with the outlet ends of said first mentioned passages and extending in a direction having a lesser radial component, whereby material is attenuated in said first mentioned passages and compacted in said second mentioned passages and discharged therefrom.

9. An apparatus for treating flowable material, including a high speed rotor having a row of passages extending in a direction having a substantial radial component, means for maintaining a non-rotating supply of said material in communication with the inlets to said passages, whereby material entering said passages is sheared from said supply and forced outwardly by centrifugal force and attenuated, and said rotor also having passages with their inlets communicating with the outlet ends of said first mentioned passages and extending in a direction having a lesser radial component, whereby the material attenuated in said first mentioned passages is compacted in said second mentioned passages and discharged therefrom, and a non-rotating discharge member for shearing material from the rotating material discharged from said second mentioned passages and delivering it from the apparatus.

10. An apparatus for treating flowable material, including a high speed rotor having an inlet chamber, an outlet chamber, and passages connecting said chambers, the inlet portion of each passage communicating with said inlet chamber and extending in a direction having a substantially radal component, whereby the material is moved outwardly and attenuated by centrifugal force, and the outlet portion of each passage extending in a direction at an angle to the inlet portion and with a substantially lesser radial component, whereby said material is subjected to an attenuating and then a compacting action, non-rotatable means in said inlet chamber for delivering material to said passages, whereby said material is subjected to a shearing action as it enters said passages, and a non-rotatable member in said outlet chamber for removing material therefrom and subjecting it to a second shearing action.

11. An apparatus for treating flowable material, including a casing having spaced end walls and a connecting peripheral wall, said casing being rotatable about an axis through the center of and substantially perpendicular to said end walls, a core within said casing concentrically disposed in respect thereto and rigidly connected to and rotatable with said casing, one of said end walls and the opposed end of the core having structure forming a plurality of generally radially extending passages, and the other end wall cooperating with the other end of said core to form a collecting space, the periphery of said core having structure forming a plurality of passages each closed at its outer side by said peripheral wall and communicating at one end with the outer ends of said first mentioned passages and at the other end with said collecting space, a non-rotatable distributor element centrally disposed within said casing to receive said flowable material from outside said casing and deliver said material to the inner ends of said radially extending passages, whereby said material is subjected to a shearing action as it enters said passages, and a non-rotatable ejector element disposed in said collecting space for removing said material from the latter, subjecting it to a shearing action, and discharging it from said casing.

HENRY W. BEVARLY.

REFERENCES CITED

The following references are of record in the file of this patent:

UNITED STATES PATENTS

| Number | Name | Date |
| --- | --- | --- |
| 1,363,572 | Dalzell | Dec. 28, 1920 |
| 1,496,641 | Hurrell | June 3, 1924 |
| 1,650,088 | Molin | Nov. 22, 1927 |
| 1,733,724 | Downs | Oct. 29, 1929 |
| 1,795,958 | McFarlane, Jr. | Mar. 10, 1931 |
| 1,819,118 | Preleuthner | Aug. 18, 1931 |
| 2,015,056 | Barnes | Sept. 24, 1935 |
| 2,103,887 | Bowen et al. | Dec. 28, 1937 |
| 2,239,152 | Jacobsen | Apr. 22, 1941 |
| 2,318,293 | Cornell | May 4, 1943 |

FOREIGN PATENTS

| Number | Country | Date |
| --- | --- | --- |
| 545,994 | Germany | Oct. 12, 1936 |